Figure 1:
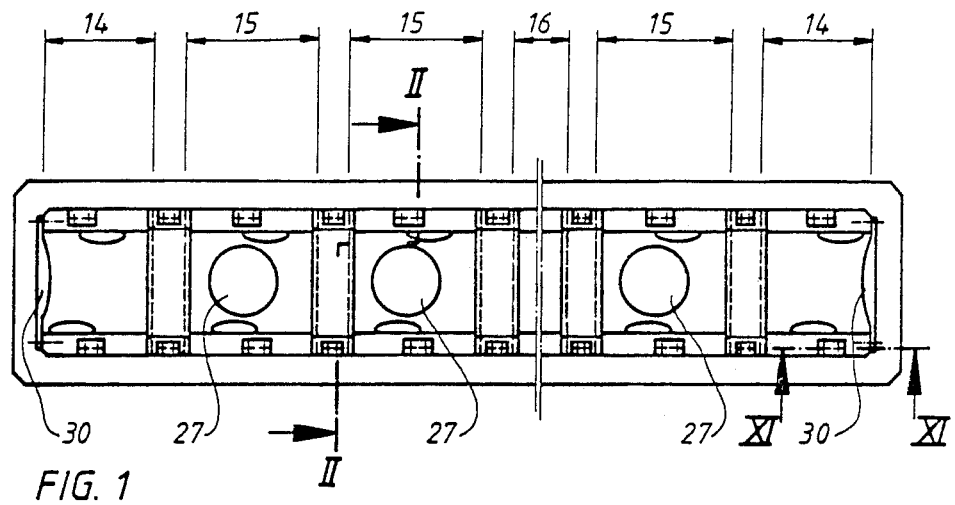

United States Patent [19]

Deutschmann

[11] Patent Number: 4,869,064
[45] Date of Patent: Sep. 26, 1989

[54] EXHAUST GAS LINE FOR A SUPERCHARGED, MULTI-CYLINDER PISTON INTERNAL COMBUSTION ENGINE

[75] Inventor: Herbert Deutschmann, Friedrichshafen, Fed. Rep. of Germany

[73] Assignee: MTU Friedrichshafen GmbH, Friedrichshafen, Fed. Rep. of Germany

[21] Appl. No.: 221,459

[22] PCT Filed: Jul. 21, 1987

[86] PCT No.: PCT/DE87/00325
§ 371 Date: Jun. 8, 1988
§ 102(e) Date: Jun. 8, 1988

[87] PCT Pub. No.: WO88/02809
PCT Pub. Date: Apr. 21, 1988

[30] Foreign Application Priority Data

Oct. 18, 1986 [DE] Fed. Rep. of Germany ....... 3635478

[51] Int. Cl.⁴ .................................................. F01N 7/10
[52] U.S. Cl. .......................................... 60/322; 60/323
[58] Field of Search ................................... 60/322, 323

[56] References Cited

U.S. PATENT DOCUMENTS

| | | | |
|---|---|---|---|
| 3,727,410 | 4/1973 | Scheitlin | 60/322 |
| 4,182,122 | 1/1980 | Stratton | 60/322 |
| 4,658,580 | 4/1987 | Schley | 60/322 |

FOREIGN PATENT DOCUMENTS

3018742 11/1981 Fed. Rep. of Germany .

Primary Examiner—Douglas Hart
Attorney, Agent, or Firm—Barnes & Thornburg

[57] ABSTRACT

An inner line (11) conducting the exhaust gases is arranged within a gas-tight housing (12, 13) surrounding the inner line (11) with a spacing. The inner line (11 l) is assembled of individual sections (15) whereby the length of a section (15) corresponds approximately to the cylinder spacing of the piston internal combustion engine. Each section (15) of the inner line (11) consists of two channel-shaped parts (15a, 15b) which with flanges (18, 19) formed-on at the two longitudinal edges resting one upon the other form between them the line cross section. The flanges (18, 19) of the channel-shaped parts are secured at the surrounding housing (12, 13) by bolts (22, 23). The manufacture of the inner line (11) from sheet metal under avoidance of welded connections permits a particularly economic manufacture and results in a weight-saving type of construction.

19 Claims, 4 Drawing Sheets

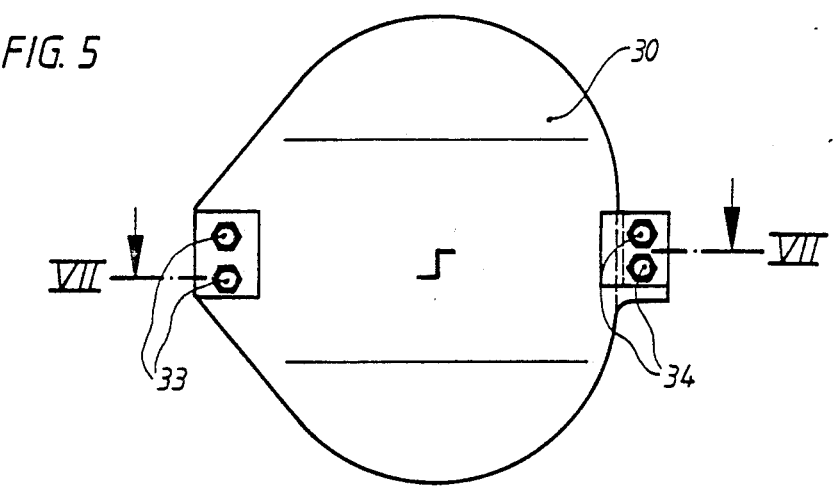
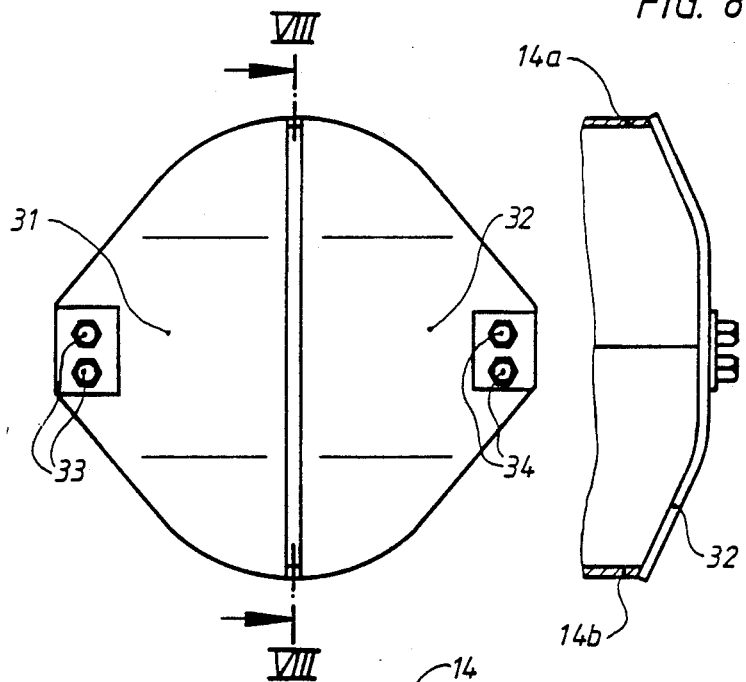
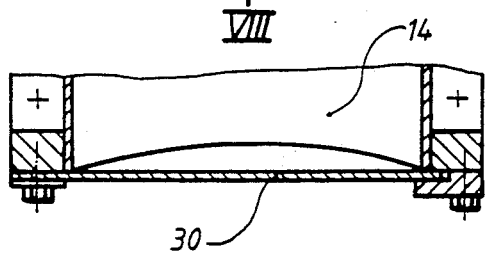

EXHAUST GAS LINE FOR A SUPERCHARGED, MULTI-CYLINDER PISTON INTERNAL COMBUSTION ENGINE

DESCRIPTION

The invention relates to an exhaust gas line for supercharged piston internal combustion engine. Such encased exhaust gas lines effect a minimal heat loss from the exhaust gas and are used in applications which require low surface temperatures.

An exhaust gas line of the aforementioned type is known from the DE-OS 34 45 916. During the operation the inner line conducting the exhaust gas is subjected to high alternating loads by reason of a high exhaust gas temperature, of the pulsating exhaust gas flow and of the vibrations stemming from the piston internal combustion engine. A particular problem is the operationally reliable fastening of the inner line having nearly exhaust gas temperature at the surrounding housing, cooled under some circumstances. The thermal expansion differences by reason of different and changing temperatures between the fastening devices of the inner line and the housing effect relative movements which lead to local friction wear. Additionally, welded connections at the carrying elements of the inner line are particularly susceptible to cracking at the occurring alternating loads.

It is therefore the task of the invention to create for an exhaust gas line of the aforementioned type an inner line in which no welded connections are required. The shape which is given to the channel-shaped parts, renders superfluous welded connections at the inner line and reduces the cracking sensitivity. Prestress produced during the assembly in the channel-shaped parts by the spreading, which in cold condition represents a completely non-critical load for the structural components, is compensated when reaching the operating temperature by reason of the thermal expansion. The structural component stresses which are otherwise produced by thermal expansion and are critical at high temperature, do not exist in the exhaust gas line according to the invention.

Relative movements between housing and inner line are avoided during temperature change by the arrangement of the bolts for fastening the inner line and the gas forces occurring during the operation are diverted into the housing without any deformations resulting at the inner line.

The advantages achieved with the invention reside in particular in that the channel-shaped parts of the sections for the inner line can be made particularly economically from sheet metal, in that a reduced material stress results at operating temperature of the inner line owing to the prestress, in that inexpensive material with less highly developed heat resistance can be used thereby for the manufacture of the channel-shaped parts and in that an operationally reliable and at the same time weight-saving manner of construction of the exhaust gas line has been found with the proposed construction of the inner line.

Figure 2:
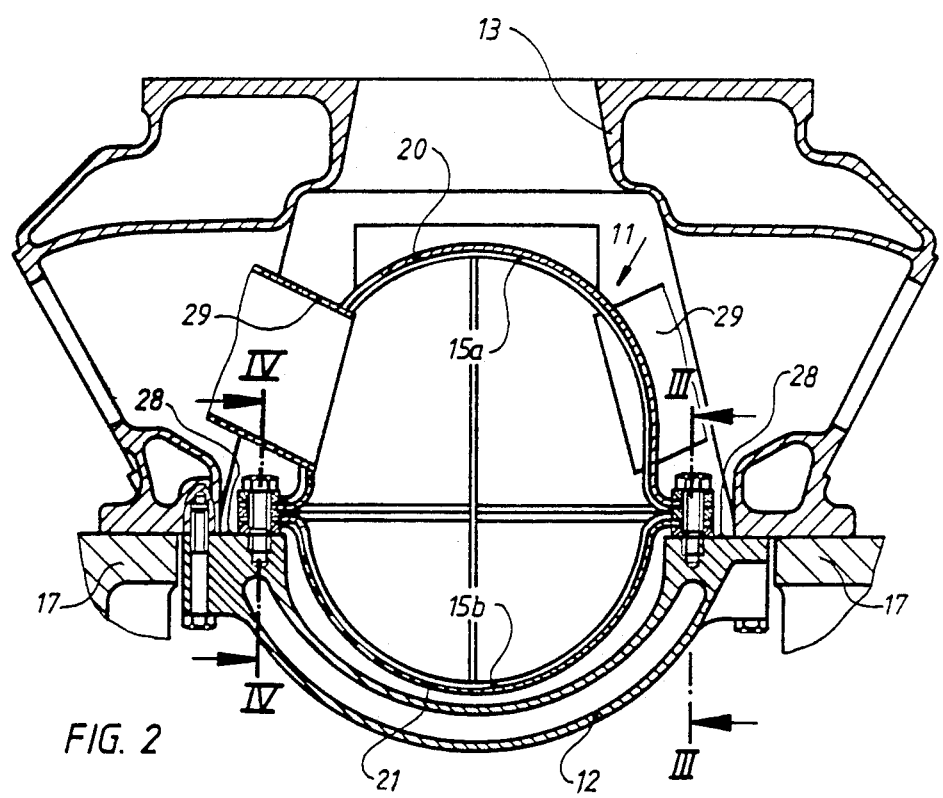
Figure 3:
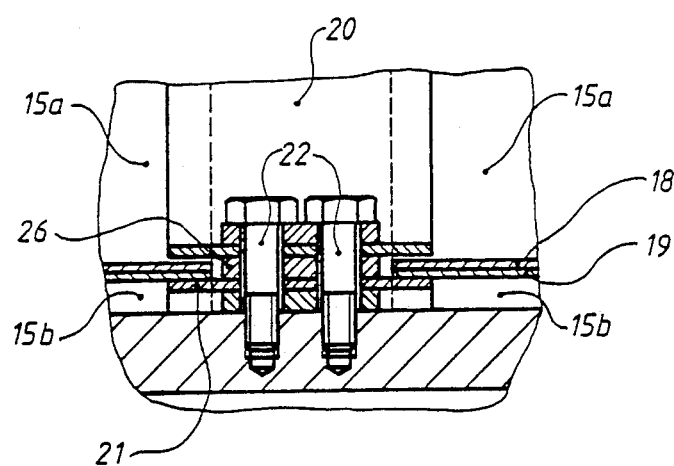
Figure 4:
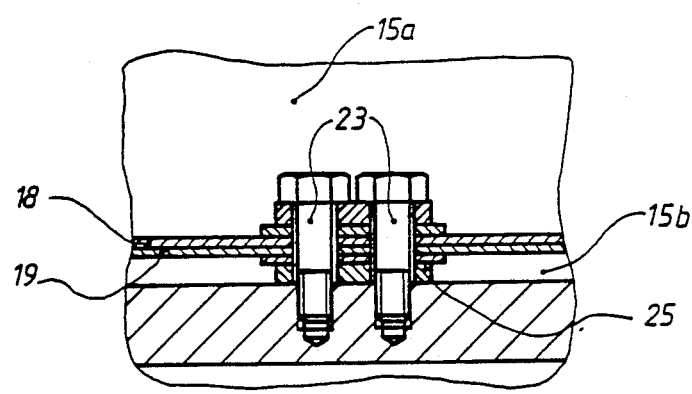
Figure 9:
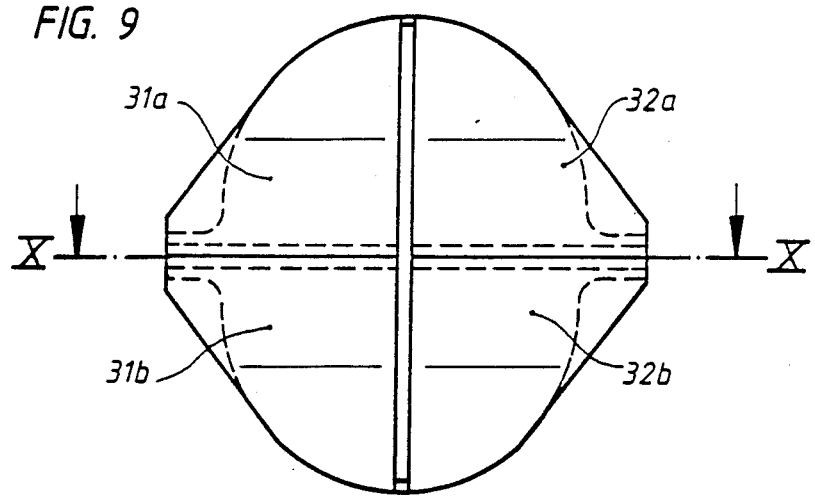
Figure 10:
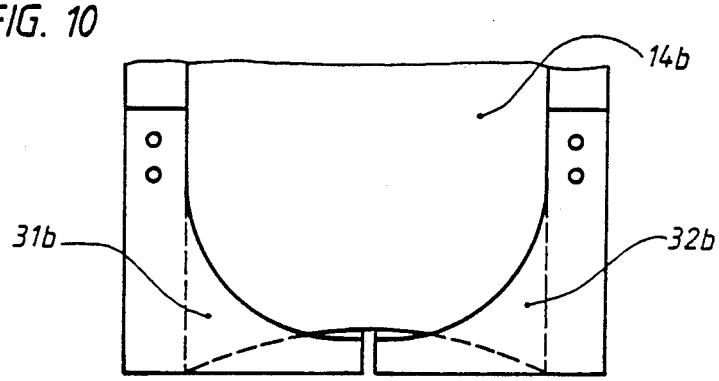
Figure 11:
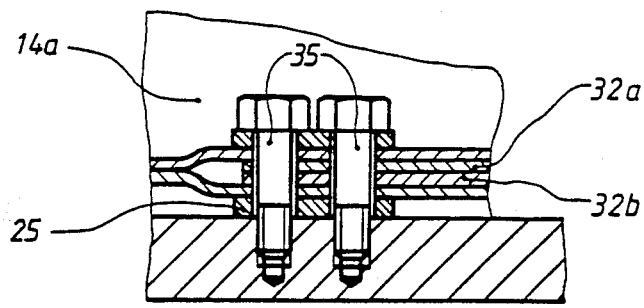

An embodiment of the invention is illustrated in the drawings and will be described more fully hereinafter. It is shown:

FIG. 1 top plan view of the installed inner line of an exhaust gas line;

FIG. 2 cross section of an exhaust gas line according to lien II—II in FIG. 1;

FIG. 3 cross section through a fastening device for the cover strips according to line III—III in FIG. 2;

FIG. 4 cross section through a fastening device for the channel-shaped parts according to line IV—IV in FIG. 2;

FIG. 5 elevational view of an end of the inner line with a one-piece cover;

FIG. 6 elevational view of an end of the inner line with two-partite cover;

FIG. 7 cross section through the fastening device of a cover of the inner line according to line VII—VII in FIG. 5;

FIG. 8 cross section of an end of the inner line according to line VIII—VIII in FIG. 6;

FIG. 9 elevation of an end of the inner line with for-partite cover;

FIG. 10 cross section in the end area of the inner line according to line X—X in FIG. 9;

FIG. 11 cross section through a fastening device of an end section of the inner line according to line XI—XI in FIG. 1.

In a supercharged, multi-cylinder piston internal combustion engine an exhaust gas line is disposed in the space of the cylinder crankcase 17 between the V-shaped arranged cylinder rows. The exhaust gases from the cylinders of both rows are received by an inner line 11 which is surrounded with a spacing by a gas-tight liquid-cooled housing 12, 13.

Exhaust gas connections 29 are arranged at the exhaust openings of the cylinders which protrude through corresponding openings into the inner line 11 but are not connected with the same. Several openings 27 are arranged at the inner line 11 for the connection of the exhaust gas inlets to the exhaust gas turbochargers.

The inner line 11 is assembled of individual sections 14, 15, 16 whose length corresponds in each case approximately to the cylinder spacing of the piston internal combustion engine. Each section 14, 15, 16 consists of two channel-shaped parts, for example, 15a, 15b, in FIG. 2, which with flanges 18, 19 formed-on at the two longitudinal edges and resting one upon the other form between them the line cross section. The channel-shaped parts of each section 14, 15, 16 are secured by means of the flanges on brackets 28 of the surrounding housing 12, 13. The sections 14, 15, 16 of the inner line are arranged adjoining one another in the longitudinal direction in expansion joints without mutually contacting one another. Cover strips 20, 21, which are matched to the outer contour of the channel-shaped parts, are arranged at each expansion joint disposed between two sections 14, 15, 16 of the inner line, which overlap the ends of the adjacent sections of the inner line 11. As a result thereof, the leakage gas flow into the space between inner line and housing is very small and therewith also the heat loss from the exhaust gas.

The sections 14, 15, 16 of the inner line 11 are fastened in longitudinal and cross direction by bolts 23. The bolts 23 of the sections 14, 15, 16 are each arranged in a plane centrally between the gas exhaust flows of two oppositely disposed exhaust gas connections 29. The jet pressure exerted on the wall of the channel-shaped parts by the exhaust gas flow is thus directly absorbed by the bolts 23. Deformations of the inner line by gas forces are therewith avoided. A small contact area between the inner line 11 and the housing 12 results at the fastening places by washer-type plates 25 which additionally may be constructed heat-insulating. As a result thereof, the heat flow from the inner line which reaches nearly exhaust temperatures, into the housing is kept small. The cover strips 20, 21 are secured also in longitudinal and cross direction by bolts 22 whereby for heat insulation also the washer-type plates 25 are used. The inner circumferential length of a cover strip 20, 21 measured from flange to flange, is constructed larger approximately in the order of magnitude of the wall thickness of a channel-shaped part than the outer circumferential length of the coordinated channel-shaped part. Together with the arrangement of a spacer plate 26 between the flanges of the cover strips 20, 21 care is taken for the fact that within the overlapping zone a gap remains in the flange and circumferential area between the sections 14, 15, 16 and the cover strips 20, 21. As a result thereof, the relative movement between the ends of the sections and the cover strips 20, 21 eventually occurring during the operation in the overlapping zone as a consequence of the thermal expansion are not impaired in longitudinal direction.

The internal width of a cover strip 20, 21 in the flange plane is smaller approximately in the order of magnitude of the wall thickness of a channel-shaped part than the corresponding width dimension of the coordinated channel-shaped part. A contact between the cover strips 20, 21 and the respectively coordinated channel-shaped parts results therefrom during the assembly of the inner line within the overlapping zone in a center area of the channel arc. Owing to the defined undersize of the cover strip, the force exerted on the channel shaped parts at the contact places is very small so that no impairment of thermal expansions in the longitudinal direction results therefrom. However, the force is large enough in order to dampen vibrations of the channel-shaped parts.

During the assembly the inner line 11 is given a prestress acting transversely to the longitudinal direction by spreading of the channel-shaped parts of each section 14, 15, 16. The spreading takes place by an amount which corresponds to the thermal expansion to be expected at operating temperature. The prestress produced in the channel-shaped parts by the spreading which represents in cold condition a completely noncritical stress for the structural component, is compensated when reaching the operating temperature as a result of the thermal expansion. The structural component stresses which are otherwise produced by impaired thermal expansion and which are critical at high temperature are thus not present.

At both ends of the inner line 11, the end openings are closed off by covers 30, 31, 32 detachably secured at the channel-shaped parts by means of bolts. Each cover 30, 31 32 has an arcuate shape extending transversely to the flange plane which deviates from the contour of the coordinated end opening so that only the upper and lower edge area of the cover 30, 31 32 has contact with the corresponding channel-shaped parts 14a, 14b prior to the fastening. During the assembly, the cover 30, 31, 32 adapts itself to the contour of the end opening by deformation of the arcuate shape. A prestress thus results in the cover 30, 31, 32 which prevents vibrations of the upper and lower cover areas.

A construction of the end closure of the inner line 11 by means of a one-piece cover 30 is illustrated in FIG. 5 which is rigidly fastened on one side within the area of the flange plane and is displaceably secured at the end section 14 of the inner line 11 at the oppositely disposed side by a clamping piece. During warm-up, the cover can expand without impairment toward the side of the clamping piece.

FIG. 6 illustrates a modification of the end closure of the inner line 11 by means of covers which are divided by an expansion joint extending perpendicularly to the flange plane. Each cover half 31, 32 is thereby rigidly fastened by itself at the end section 14 of the inner line 11 within the area of the flange plane by means of bolts 33, respectively, 34. The thermal expansion of the cover halves 31, 32 is absorbed in the expansion joint. At operating temperature, the expansion joint is nearly closed so that also at these places only little leakage gas can escape into the space between the inner line and the housing.

Another modification of the end closure can be seen from FIG. 9. Each cover half 31, 32 is thereby divided once more in the flange plane. Within this dividing plane a flange pointing toward the line interior is thereby formed-on at each of the four cover parts 31a, 31b, 32a, 32b, which extends in the flange plane of the channel-shaped parts 14a, 14b in the longitudinal direction of the inner line 11 up to bolts 35. The flanges of the cover parts 31a, 31b, 32a, 32b are arranged between the flanges of the channel-shaped parts 14a, 14b. The four flanges which thereby rest one upon the other on each side of the inner line 11 are fastened together at the housing 11 by the bolts 35.

What is claimed is:

1. An exhaust gas line for a supercharged multi-cylinder piston internal combustion engine, comprising at least one inner line means conducting the exhaust gases, gas-tight housing means surrounding said line means with a spacing, the inner line means being formed of individual sections and the length of a section corresponding approximately to the cylinder spacing of the piston internal combustion engine, each section of the inner line means including two channel-shaped parts which together with flanges formed-on at the two longitudinal edges resting one upon the other, form between them the line cross section, the sections of the inner line means being arranged adjoining one another in the longitudinal direction in expansion joints, and the flanges of the channel-shaped parts being secured at the surrounding housing means.

2. An exhaust gas line according to claim 1, further comprising cover strip means arranged at each expansion joint disposed between two sections of the inner line means, said cover strip means being matched to the channel-shaped parts and overlapping the ends of adjacent sections of the inner line means.

3. An exhaust gas line according to claim 2, wherein the interior width of a cover strip means in the flange plane is smaller approximately in the order of magnitude of the wall thickness of a channel-shaped part than the corresponding width dimension of the coordinated channel-shaped part.

4. An exhaust gas line according to claim 3, wherein the inner circumferential length of a cover strip means is larger approximately in the order of magnitude of the wall thickness of a channel-shaped part than the outer circumferential length of the coordinated channel-shaped part.

5. An exhaust gas line according to claim 2, wherein a prestress acting transversely to the longitudinal direction is imparted to the individual sections during the assembly of the inner line means by spreading of the channel-shaped parts and of the cover strip means in the flange plane.

6. An exhaust gas line according to claim 2, wherein the sections of the inner line means and the cover strip means are fixed at the flanges in the longitudinal and transverse direction by bolt means.

7. An exhaust gas line according to claim 6, wherein a heat-insulating washer plate is arranged between the flanges and the housing means at each bolt means.

8. An exhaust gas line according to claim 6, wherein the bolt means for the sections are arranged in each case approximately within the plane of the gas exhaust flow of the associated cylinder.

9. An exhaust gas line according to claim 1, wherein end openings provided at the ends of the inner line means are closed off by cover means detachably secured at the channel-shaped parts.

10. An exhaust gas line according to claim 9, wherein each cover means has an arcuate configuration extending transversely to the flange plane which deviates from the contour of the coordinated end opening so that only the upper and lower edge area of the cover means is in contact with the corresponding channel-shaped part prior to the fastening.

11. An exhaust gas line according to claim 10, wherein each cover means is rigidly secured on one side within the area of the flange plane and is displaceably secured on the oppositely disposed side.

12. An exhaust gas line according to claim 9, wherein each cover means is divided perpendicularly to the flange plane in an expansion joint and each cover half is rigidly secured by itself within the area of the flange plane.

13. An exhaust gas line according to claim 12, wherein each cover half is further divided in the flange plane and a flange pointing toward the line interior is formed-on at each of the four partial covers.

14. An exhaust gas line according to claim 13, wherein the flanges of the partial covers are arranged between the flanges of the channel-shaped parts and all four flanges are secured at the housing means on each side of the inner line means together by bolt means.

15. An exhaust gas line according to claim 14, wherein each cover means has an arcuate configuration extending transversely to the flange plane which deviates from the contour of the coordinated end opening so that only the upper and lower edge area of the cover means is in contact with the corresponding channel-shaped part prior to the fastening.

16. An exhaust gas line according to claim 9, wherein each cover means is rigidly secured on one side within the area of the flange plane and is displaceably secured on the oppositely disposed side.

17. An exhaust gas line according to claim 4, wherein a prestress acting transversely to the longitudinal direction is imparted to the individual sections during the assembly of the inner line means by spreading of the channel-shaped parts and of the cover strip means in the flange plane.

18. An exhaust gas line according to claim 2, wherein end opening provided at the ends of the inner line means are closed off by cover means detachably secured at the channel-shaped parts.

19. An exhaust gas line according to claim 18, wherein the sections of the inner line means and the cover strip means are fixed at the flanges in the longitudinal and transverse direction by bolt means.

* * * * *